(12) United States Patent
Chan et al.

(10) Patent No.: US 11,312,504 B2
(45) Date of Patent: Apr. 26, 2022

(54) AIRCRAFT TUG SINGLE PIVOT CRADLE WITH LATCH

(71) Applicants: Anthony Chan, Sierra Madre, CA (US); Tracy Haeggstrom, Orange, CA (US)

(72) Inventors: Anthony Chan, Sierra Madre, CA (US); Tracy Haeggstrom, Orange, CA (US)

( * ) Notice: Subject to any disclaimer, the term of this patent is extended or adjusted under 35 U.S.C. 154(b) by 203 days.

(21) Appl. No.: 16/268,236

(22) Filed: Feb. 5, 2019

(65) Prior Publication Data
US 2020/0247559 A1 Aug. 6, 2020

(51) Int. Cl.
*B64F 1/22* (2006.01)

(52) U.S. Cl.
CPC .................. *B64F 1/227* (2013.01)

(58) Field of Classification Search
CPC ....................................... B64F 1/227
See application file for complete search history.

(56) References Cited

U.S. PATENT DOCUMENTS

| | | | | |
|---|---|---|---|---|
| 5,333,416 A * | 8/1994 | Harris | ................ | B64D 11/0015 312/7.2 |
| 5,374,104 A * | 12/1994 | Moore | ................... | A47C 7/723 297/188.16 |
| 10,625,880 B1 * | 4/2020 | Chan | .................... | B62D 55/062 |
| 2005/0186055 A1 * | 8/2005 | Hyatt | ..................... | B64F 1/227 414/427 |
| 2006/0170173 A1 * | 8/2006 | Darling | .................... | B62B 1/12 280/79.2 |
| 2006/0186622 A1 * | 8/2006 | Darling | ................... | B62B 1/002 280/35 |
| 2009/0151137 A1 * | 6/2009 | Darling, III | ............. | B62B 1/12 24/568 |
| 2009/0212535 A1 * | 8/2009 | Darling, III | ......... | A61G 1/0293 280/651 |
| 2014/0048342 A1 * | 2/2014 | Chan | ...................... | B64F 1/228 180/6.7 |
| 2014/0072393 A1 * | 3/2014 | Hammonds | ............. | B64F 1/227 414/427 |
| 2016/0000170 A1 * | 1/2016 | Simons | .................. | A42B 3/185 2/424 |

* cited by examiner

*Primary Examiner* — Saul Rodriguez
*Assistant Examiner* — Ashley K Romano
(74) *Attorney, Agent, or Firm* — Edwin Tarver

(57) ABSTRACT

A pivoting cradle apparatus for capturing an aircraft wheel on an aircraft tug includes a cradle sized for holding the wheel, mounted on at least one pivot block and configured to pivot between a wheel loading position and a wheel retaining position. A latch mechanism is disposed under the cradle, biased to swing into an upright position wherein it seats in a notch on the cradle, locking the cradle in the wheel retaining position. A latch release mechanism is configured to urge the latch out of the upright position, and when it does so, the latch slides along the underside of the cradle as the cradle pivots down. into the wheel loading position.

18 Claims, 5 Drawing Sheets

AIRCRAFT TUG SINGLE PIVOT CRADLE WITH LATCH

BACKGROUND

The present invention generally relates to aircraft tugs. More specifically, the present invention relates to a pivoting cradle apparatus for an aircraft tug.

Aircraft tugs are known in the art, and principally comprise a pair of tracks or similar wheel-like structures for movement. The tracks support a base on which a cradle or similar wheel-confining structure is provided. The cradle is generally configured to hold aircraft wheels of particular sizes, and may be configured for capturing an aircraft wheel using a variety of techniques.

Several problems exist with aircraft tug cradle apparatus currently known in the art. Conventional tug cradle designs typically have an excessive number of moving parts, which renders them both expensive to manufacture and difficult to maintain. Additionally, cradle apparatus comprising a large plurality of moving parts tend to be weaker and prone to malfunction due to the stresses from aircraft weight and movement. If one or more components bends out of shape, for example, the entire cradle assembly may be disabled.

In most conventional cradle apparatus, a latch design is provided using tensile force to lock the cradle in a wheel retaining position and unlock it. For example, a hook type latch may be provided, which is prone to bending an unintentional release. Also, because conventional cradle designs have hook type, or similar, latching mechanisms, they contribute to an undesired increase in cradle size, resulting in larger heavier tugs being needed. Conventional cradle designs are also sometimes incompatible with turntable type aircraft tugs.

Accordingly, there is a need for a cradle apparatus for an aircraft tug having fewer moving parts than conventional tug cradle designs. There is also a need for a rigid cradle design which is stronger than conventional cradle designs, and there is also a need for an aircraft cradle design that applies a compression force for latching instead of tensile force, thus resulting in a stronger and more reliable latch, and allows the cradle to be used on smaller and lighter tugs. Additionally, there is a need for a cradle design that can work on either a turntable type tug or a non-rotating tug.

SUMMARY

A pivoting cradle apparatus is disclosed for capturing a vehicle wheel, such as an aircraft front wheel, onboard an aircraft tug. In one preferred embodiment, the apparatus principally comprises a right side pivoting member and a left side pivoting member, the right side pivoting member and the left side pivoting member are spaced apart by a front connecting brace and a rear connecting brace, thereby forming a cradle of suitable size for holding the aircraft wheel. A first pivot block is provided, and located under the right side pivoting member and a second pivot block disposed under the left side pivoting member, the first pivot block and the second pivot block are configured such that cradle pivots between a wheel loading position with the front connecting brace lowered, and a wheel retaining position with the front connecting brace raised.

A latch mechanism is preferably disposed under the cradle. The latch mechanism is movable between a locked state, holding the cradle in the wheel retaining arrangement, and an unlocked state, wherein the cradle is released from the wheel retaining arrangement. A latch release mechanism is provided, and is configured to urge the latch mechanism from the locked state to the unlocked state. In some cases, the first pivot block, the second pivot block, and the latch mechanism are mounted on a turntable, with the turntable mounted on the base plate of the aircraft tug.

In one preferred embodiment, the cradle is biased to pivot on the first pivot block and the second pivot block toward the wheel loading position. To assist with loading the vehicle wheel, the apparatus may include a rear roller proximal the rear connecting brace, and a front roller proximal the front connecting brace. Preferably, the latch mechanism is a hinged member, which is biased to a raised position, and in one embodiment, includes a latch adjuster screw to help with release adjustments and tuning. To help seat the latch mechanism in place, the cradle may comprise a cradle notch for capturing the latch mechanism.

The latch release mechanism preferably comprises a pivot arm anchored to a release pivot point, and is movable to release the latch mechanism. To assist with releasing the latch mechanism, the release mechanism includes a release plunger coupled to the pivot arm. The release plunger is configured to engage the latch mechanism, preferably from below, and urge it out of the locked state. This may be accomplished by the release plunger impinging on the latch adjuster screw of the latch mechanism as well.

In another embodiment, the apparatus may be characterized as a pivoting cradle apparatus for capturing a vehicle wheel on an aircraft tug, which includes a right side pivoting member and a left side pivoting member, which are each spaced apart by a front connecting brace and a rear connecting brace to form a cradle of suitable size to hold the vehicle wheel. A first pivot block is located under right side pivoting member and a second pivot block disposed under the left side pivoting member, the first pivot block and the second pivot block are preferably configured such that cradle pivots between a wheel loading position with the front connecting brace lowered, and a wheel retaining position with the front connecting brace raised.

A latch mechanism is disposed under the cradle. The latch mechanism includes a hinged member configured to swing into an upright position. In the upright position, the latch mechanism seats in a cradle notch on the cradle, thus locking it in the wheel retaining position. A latch release mechanism is also provided. The latch release is configured to urge the latch mechanism out of the cradle notch and away from the upright position. Since the latch mechanism is biased to the upright position, it slides along the underside of the cradle, as the cradle pivots, pressing the latch mechanism into a lowered position.

In this embodiment, the lowered position is substantially horizontal. Additionally, the first pivot block, the second pivot block, and the latch mechanism may be mounted on a turntable, with the turntable mounted on the aircraft tug. To assist with transitioning to the wheel loading position, the cradle may be biased to pivot on the first pivot block and the second pivot block toward the wheel loading position. The latch mechanism also preferably comprises a latch adjuster screw.

The latch release mechanism comprises a pivot arm anchored to a release pivot point. Preferably the latch release mechanism comprises a release plunger coupled to the pivot arm, with the release plunger configured to engage the latch mechanism, and urge it out of the upright position. The release plunger may also impinge directly on the latch adjuster screw of the latch mechanism.

In another embodiment, the apparatus may also be characterized as a pivoting cradle apparatus for capturing a vehicle wheel on an aircraft tug. The apparatus includes a cradle suitable for holding the vehicle wheel, with the cradle mounted on at least one pivot block and configured to pivot between a wheel loading position and a wheel retaining position. A latch mechanism is provided, disposed under the cradle, and the latch mechanism is biased to swing into an upright position wherein it seats into a cradle notch on the cradle, locking the cradle in the wheel retaining position.

A latch release mechanism is also provided, configured to urge the latch mechanism out of the upright position. Preferably the latch mechanism slides along the underside of the cradle as the cradle pivots into the wheel loading position, bringing the latch mechanism into a lowered position. In one embodiment, the pivot block and the latch mechanism are mounted on a turntable, the turntable mounted on the aircraft tug.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
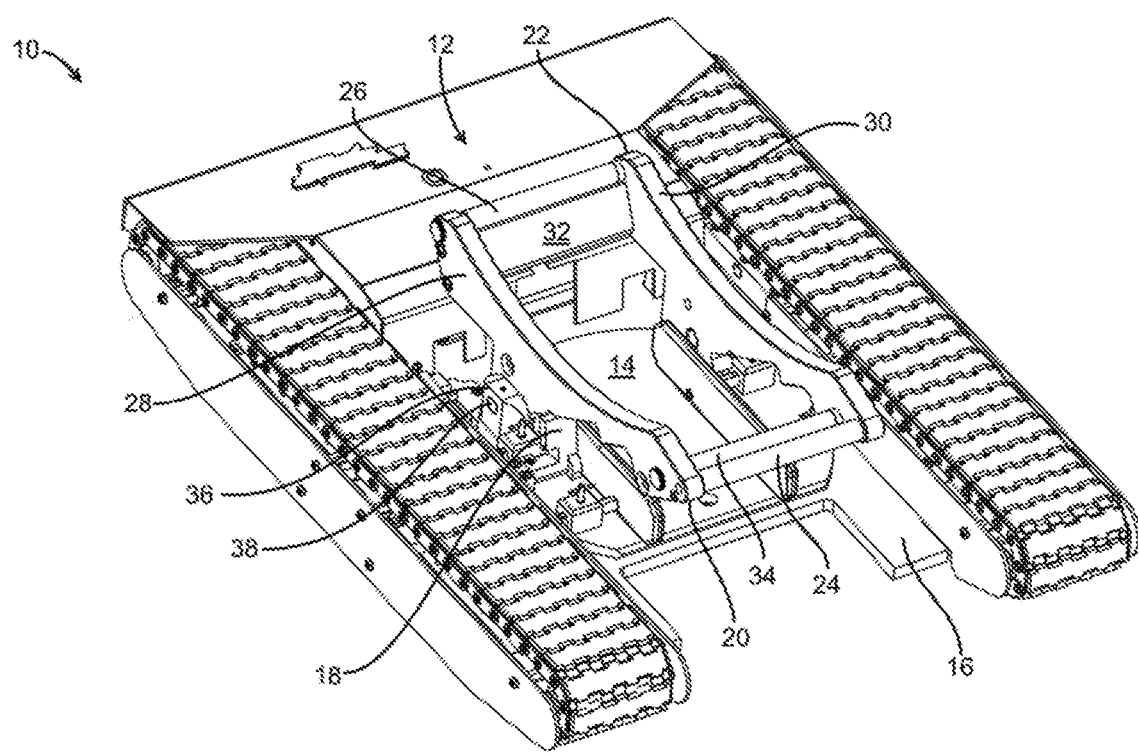
FIG. 1 illustrates a perspective view of an aircraft tug having a pivoting cradle in a wheel retaining position.

Referring to FIG. 1, an aircraft tug 10 is shown bearing a pivoting cradle 12. Although a two-track aircraft tug 10 is shown without a turntable 14, it should be understood that the pivoting cradle 12 may be mounted on any suitable aircraft tug, including those lacking turntables, having alternatives to tracks, or other alternative features. In the illustrated embodiment, the pivoting cradle 12 is mounted on the turntable 14, which is mounted on a base plate 14 of the aircraft tug 10. The pivoting cradle 12 includes latch mechanism 18, a cradle front end 20 over which an aircraft wheel 40 (FIGS. 4-7) travels, and a cradle back end 22 against which the aircraft wheel 40 engages when carried by the aircraft tug 10. The pivoting cradle 12 is shown locked in a retaining position for retaining the aircraft wheel 40.

Figure 2:
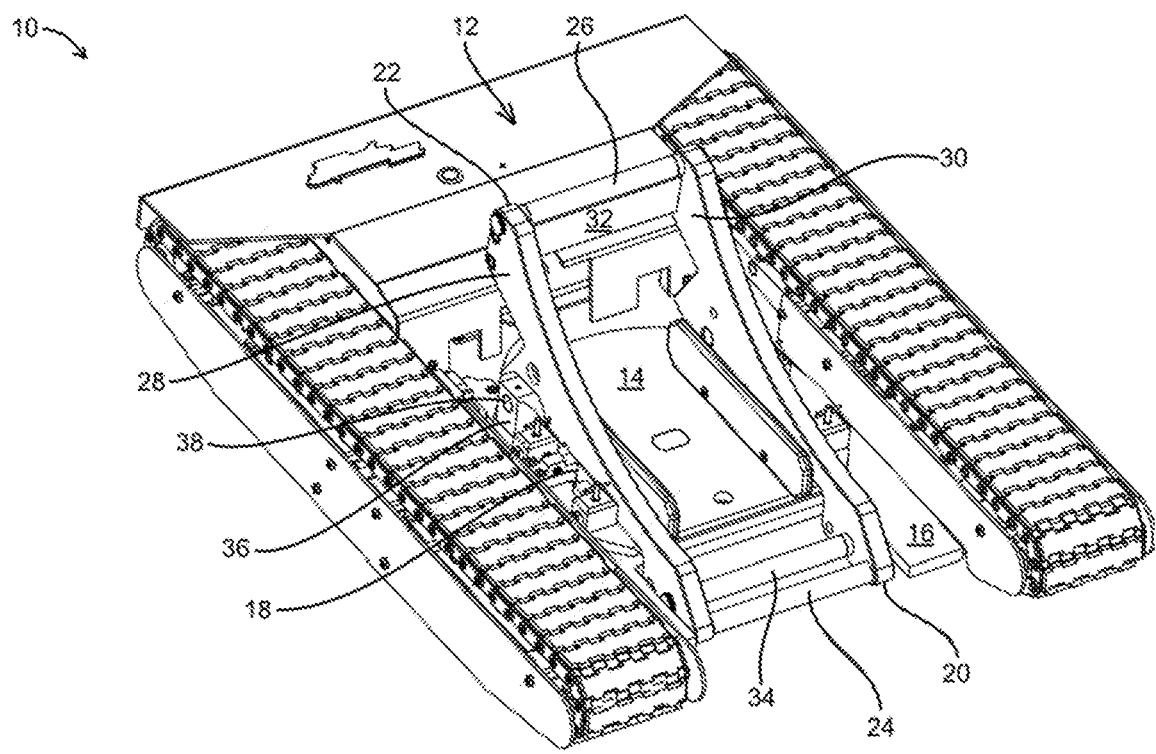
FIG. 2 illustrates a perspective view of the aircraft tug with the pivoting cradle in a wheel loading and releasing position.

Referring to FIG. 2, the aircraft tug 10 is shown bearing the pivoting cradle 12 in a wheel loading and releasing position. Preferably, the cradle front end 20 includes a front roller 24, and the cradle back end 22 includes a rear roller 26 to assist the aircraft wheel 40 with loading onto, and releasing from the pivoting cradle 12 and the aircraft tug 10. In the wheel loading and releasing position, the pivoting cradle 12 has pivoted forward, such that the cradle front end 20 is in a lowered position, and the cradle back end 22 is raised, enabling the aircraft wheel 40 to roll off the turntable 14 and away from the aircraft tug 10.

Figure 3:
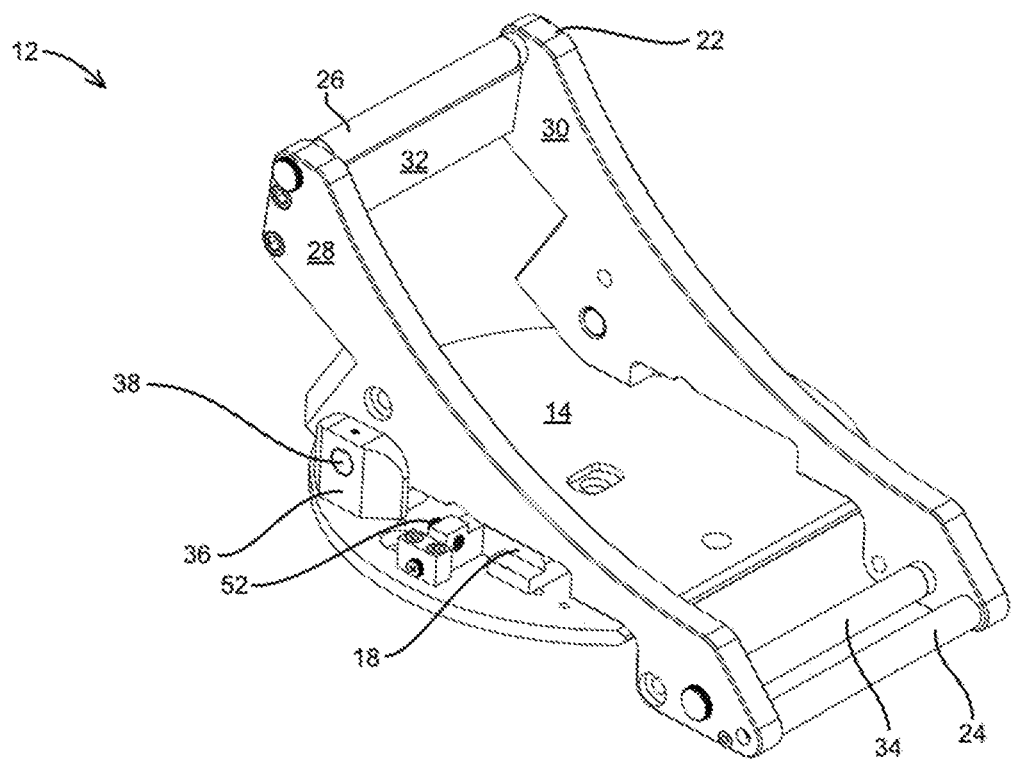
FIG. 3 illustrates a perspective view of the pivoting cradle in the wheel loading and releasing position.

Referring to FIG. 3 the pivoting cradle 12 is shown in the wheel loading and releasing position. The pivoting cradle 12 principally comprises includes a right side pivoting member 28, and a left side pivoting member 30, which are preferably rigidly connected together at the cradle back end 22 by a rear connecting brace 32 and at the cradle front end 20 by a front connecting brace 34 together, creating a cradle saddle structure. In the illustrated embodiment, the rear connecting brace 32 is located under the rear roller 26, and the front connecting brace 34 is located under the front roller 24, although any functioning arrangement is contemplated.

The pivoting cradle 12 rests on pivot blocks 36, each disposed under the right side pivoting member 28 and the left side pivoting member 30, and engaged at a cradle pivot point 38 that allows the pivoting cradle 12 to rock back and forth relative to the aircraft tug 10. As illustrated, the right side pivoting member 28 and the left side pivoting member 30 also rest on the turntable 14 when the cradle front end 20 is lowered in the wheel loading and releasing position. A latch mechanism is also provided for locking and releasing the pivoting cradle 12 in the wheel retaining position. In this illustration, the latch mechanism is shown in the released, or 'down' position.

Figure 4:
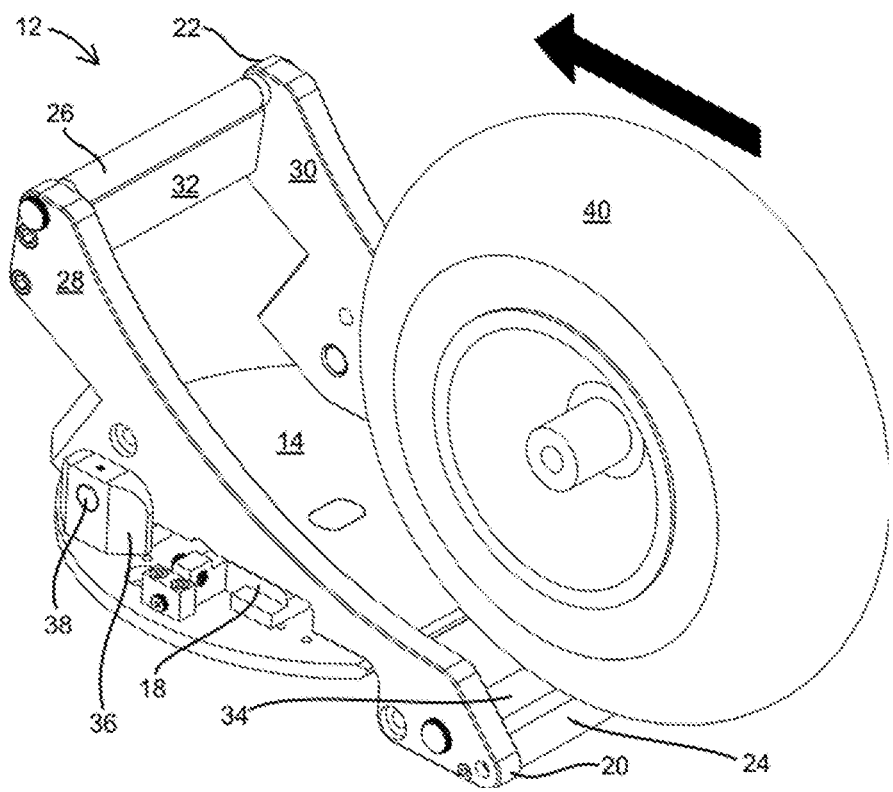
FIG. 4 illustrates a perspective view of the pivoting cradle in the wheel loading and releasing position, with a vehicle wheel being installed thereon.

Referring to FIG. 4, an aircraft wheel 40 is shown entering the pivoting cradle 12, which is in the wheel loading and releasing position with the latch mechanism 18 lowered and disengaged. In a typical course of use, the aircraft tug 10 is moved against a stationary aircraft wheel 40. As the pivoting cradle 12 encounters the aircraft wheel 40, it urges the aircraft wheel 40 up onto the cradle front end 20. Facilitating this movement, the front roller 24 rotates accordingly. In one alternative embodiment, the front connecting brace is cylindrical and may be capable of rotation as well to facilitate movement of the aircraft wheel 40 onto the pivoting cradle 12.

Figure 5:
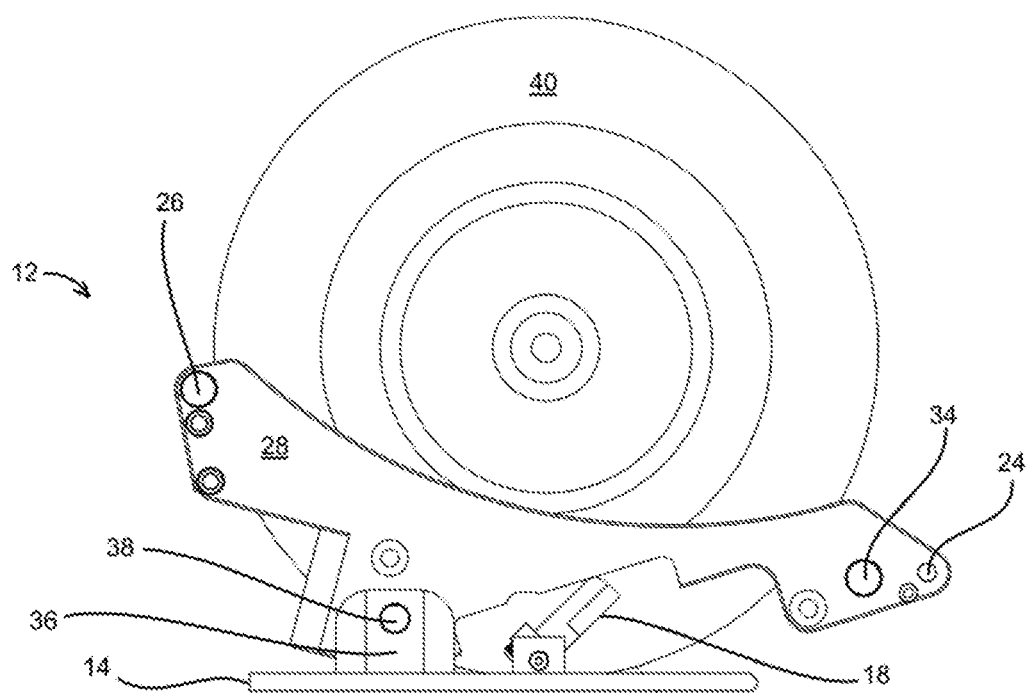
FIG. 5 illustrates an elevation view of the pivoting cradle midway between the loading and releasing position, and the retaining position in the wheel retaining position, with the vehicle wheel installed thereon.
Figure 6:
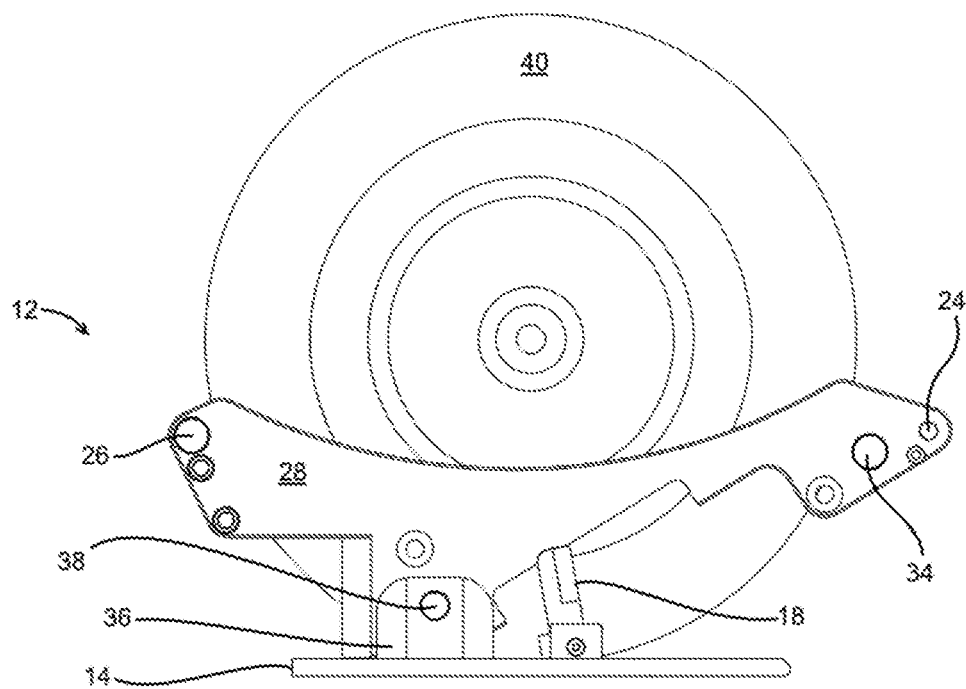
FIG. 6 illustrates an elevation view of the pivoting cradle in the retaining position, with the vehicle wheel installed thereon.

Referring to FIG. 5, the aircraft wheel 40 is shown in the process of loading onto the pivoting cradle 12, with the latch mechanism 18 approaching a locked position (see FIG. 6). In the initial stage of loading, the right side pivoting member 28 and the left side pivoting member 30 are lowered, in the illustrated embodiment with the right side pivoting member 28 holding the latch mechanism 18 in a lowered position as shown in FIG. 4. As the aircraft wheel 40 moves onto the pivoting cradle 12, it encounters the rear roller 26, urging it rearward, which causes the right side pivoting member 28 and the left side pivoting member 30 to pivot on each of the pivot blocks 36, thus raising the cradle front end 20 and lowering the cradle back end 22, and thus confining the aircraft wheel 40.

Referring to FIG. 6, the pivoting cradle 12 is shown with the aircraft wheel 40 captured in the wheel retaining position, and the latch mechanism 18 anchoring the right side pivoting member 28, and thus the pivoting cradle 12 in place in the wheel retaining position. Although the latch mechanism 18 is shown anchoring the right side pivoting member 28, in other contemplated embodiments, the latch mechanism 18 may anchor the left side pivoting member 30 according to preference. The latch mechanism preferably includes a torsion spring (not shown) or similar structure that biases the latch mechanism 18 in an upright (i.e., locked and wheel retaining) position. The right side pivoting member 28 (and alternatively, the left side pivoting member 30) includes a cradle notch 42 that conforms to the latch mechanism 18 for holding it in place, under tension from the pivoting cradle 12, and preventing it from rotating past the desired wheel retaining position.

Figure 7:
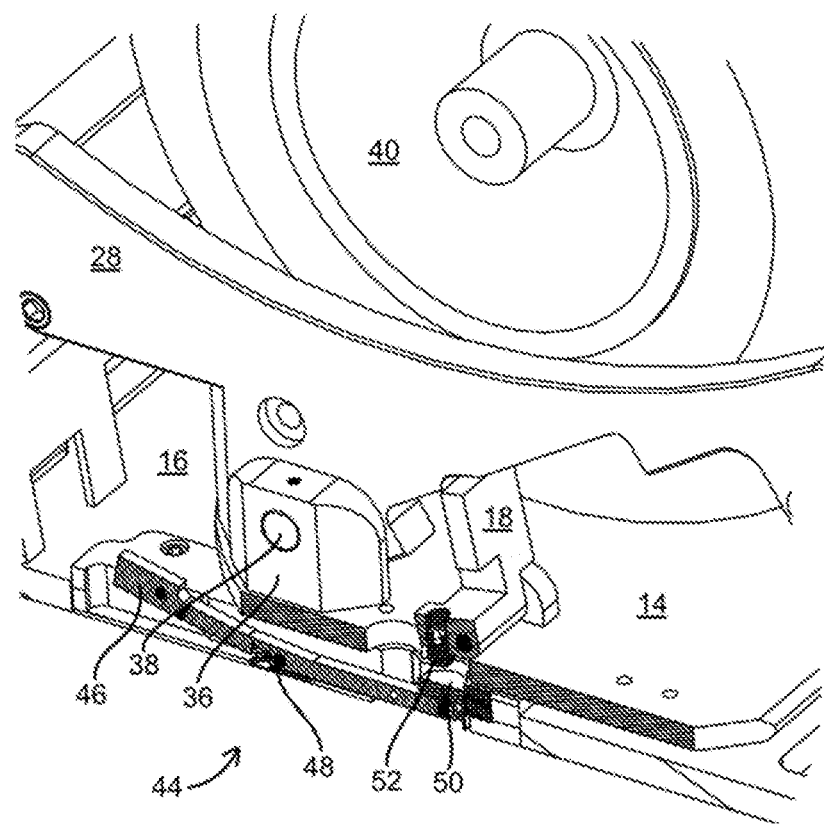
FIG. 7 is a cut-away perspective view of a latch release mechanism of the pivoting cradle.
Figure 8:
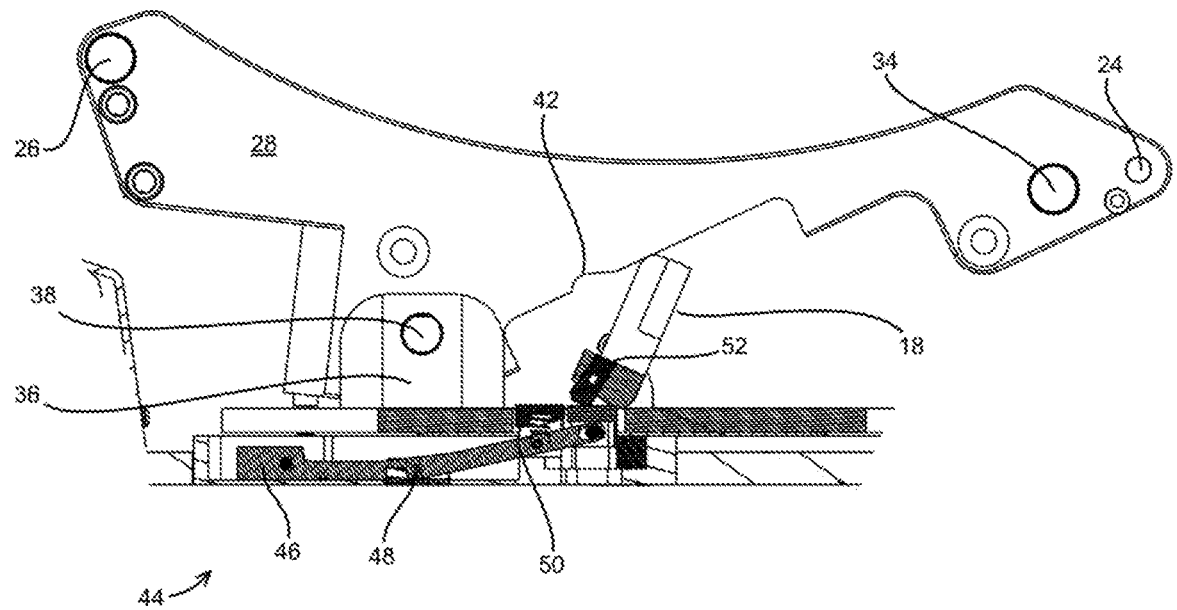
FIG. 8 is a cut away elevation view of the latch release mechanism in the process of releasing the pivoting cradle.
Figure 9:
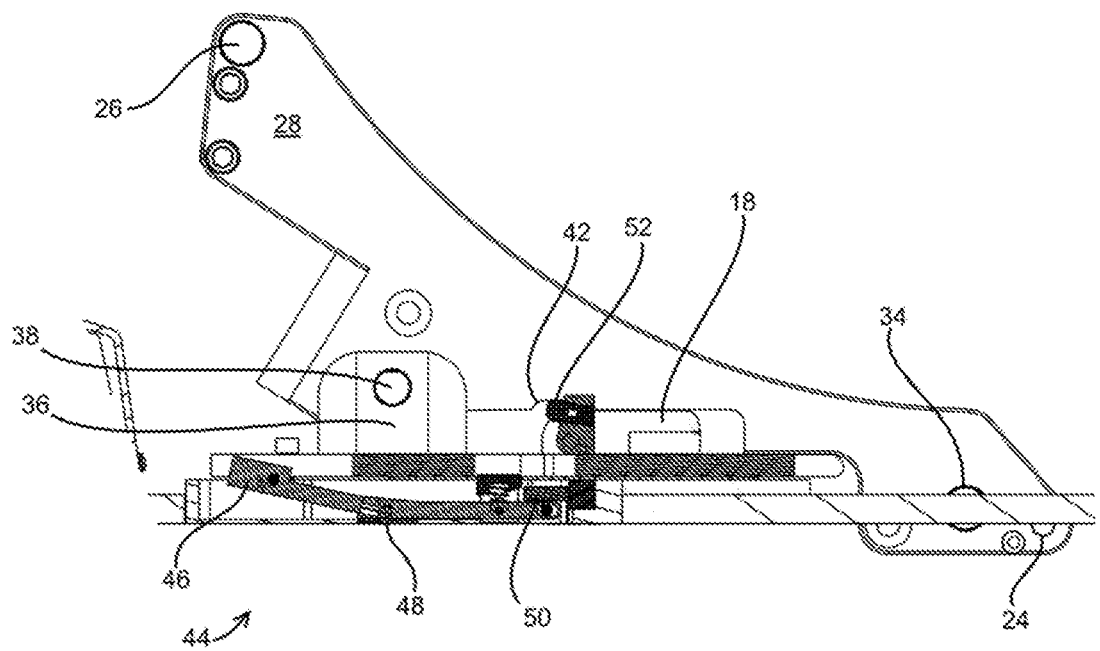
FIG. 9 is a cut-away elevation view of the latch release mechanism, with the pivoting cradle in the loading and releasing position.

FIGS. 7-9 illustrate the operation of the latch mechanism 18 and its latch release mechanism 44 to retain the pivoting cradle 12 in a locked (i.e., wheel retaining) position, and release it to return to the wheel loading and releasing position. Referring to FIG. 7, the latch release mechanism 44 comprises a pivot arm 46 anchored at a release pivot point 48, and a release plunger 50, shown in the illustrated view in a lowered position. It is anticipated the latch mechanism 18, and in particular the pivot arm 46 can be activated by manual rotation or by electro-mechanical actuation. When the latch mechanism 18 is not engaged by the latch release mechanism 44, it is biased to rise up and remain in the illustrated locked position. With the release plunger lowered on the pivot arm, the turntable 14 can rotate with the pivoting cradle 12 locked in the wheel retaining position. In one embodiment, a latch adjuster screw 52 is provided for adjusting the length of travel needed by the release plunger 50 to release the latch mechanism 18 from the wheel retaining position.

Referring to FIG. 8, the pivoting cradle 12 is shown released and moving toward the wheel loading and unloading position. To release the latch mechanism 18 from the pivoting cradle 12, the pivot arm 46 of the latch release mechanism 44 has been depressed, thereby pivoting on the release pivot point 48, and raising the release plunger 50. The release plunger 50 impinges on the latch mechanism 18, causing it to disengage from the pivoting cradle (in the illustrated embodiment, the right side pivoting member 28) and travel along the underside of the pivoting cradle 12 as the cradle front end 20 moves toward the wheel loading and unloading position. The latch mechanism 18 has a latch pivot point 54, which allows it to hingedly rotate downward and eventually come to rest, confined between the pivoting cradle 12 and the turntable 14.

Referring to FIG. 9, the pivoting cradle 12 is shown with the cradle front end 20 lowered to the wheel loading and unloading position. In this position, the latch mechanism 18 is disengaged from the pivoting cradle 12 and has been pushed down to its lowest position adjacent the turntable 14. Also in this position, the pivot arm 46 has been rotated about the release pivot point 48 so that the release plunger 50 is lowered. With the pivoting cradle 12 in the wheel loading and unloading position, an aircraft wheel 40 can be dismounted from the aircraft tug 10, or, if empty, can be maneuvered such that the aircraft tug 10 loads the wheel onboard until the pivoting cradle 12 locks in the wheel retaining position.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A pivoting cradle apparatus for capturing a vehicle wheel on an aircraft tug, the apparatus comprising:
   a right side pivoting member and a left side pivoting member, the right side pivoting member and the left side pivoting member spaced apart by a front connecting brace and a rear connecting brace, thereby forming a cradle of suitable size for holding the vehicle wheel;
   a first pivot block disposed under right side pivoting member and a second pivot block disposed under the left side pivoting member, the first pivot block and the second pivot block configured such that cradle pivots between a wheel loading position with the front connecting brace lowered, and a wheel retaining position with the front connecting brace raised;
   a hinged latch mechanism disposed under the cradle, the hinged latch mechanism movable between a locked state, holding the cradle in the wheel retaining arrangement, and an unlocked state, wherein the cradle is movable from the wheel retaining arrangement, a pivot arm anchored at a release pivot point under the cradle, and a release plunger, wherein the pivot arm is configured to rotate about the release pivot point, impinge upon the release plunger, and the release plunger is configured to impinge upon the hinged latch mechanism, and thereby rotate the hinged latch mechanism away from the cradle.

2. The apparatus of claim 1 wherein the first pivot block, the second pivot block, and the latch mechanism are mounted on a turntable, the turntable mounted on the aircraft tug.

3. The apparatus of claim 1, wherein the cradle is biased to pivot on the first pivot block and the second pivot block toward the wheel loading position.

4. The apparatus of claim 1, further comprising a rear roller proximal the connecting brace, and a front roller proximal the front connecting brace.

5. The apparatus of claim 1 wherein the latch mechanism comprises a hinged member biased to a raised position.

6. The apparatus of claim 5 wherein the latch mechanism comprises a latch adjuster screw.

7. The apparatus of claim 1 wherein the cradle comprises a cradle notch for capturing the latch mechanism.

8. The apparatus of claim 1 wherein the latch release mechanism comprises a pivot arm anchored to a turntable.

9. The apparatus of claim 8 wherein the pivot arm further comprises a release plunger configured to extend through the turntable.

10. The apparatus of claim 9 wherein the release plunger impinges on a latch adjuster screw of the latch mechanism.

11. A pivoting cradle apparatus for capturing a vehicle wheel on an aircraft tug, the apparatus comprising:
   a right side pivoting member and a left side pivoting member, the right side pivoting member and the left side pivoting member spaced apart by a front connecting brace and a rear connecting brace, thereby forming a cradle of suitable size for holding the vehicle wheel;
   a first pivot block disposed under right side pivoting member and a second pivot block disposed under the left side pivoting member, the first pivot block and the second pivot block configured such that cradle pivots between a wheel loading position with the front connecting brace lowered, and a wheel retaining position with the front connecting brace raised;

a hinged latch mechanism disposed under the cradle, the hinged latch mechanism comprising a hinged member configured to swing into an upright position, wherein it seats in a cradle notch on the cradle, locking it in the wheel retaining position; and a pivot arm anchored at a release pivot point under the cradle, and a release plunger, wherein the pivot arm is configured to rotate about the release pivot point, impinge upon the release plunger, and the release plunger is configured to impinge upon the hinged latch mechanism, and thereby rotate the hinged latch mechanism away from the cradle.

12. The pivoting cradle apparatus of claim 11 wherein the lowered position is substantially horizontal.

13. The apparatus of claim 11 wherein the first pivot block, the second pivot block, and the latch mechanism are mounted on a turntable, the turntable mounted on the aircraft tug.

14. The apparatus of claim 11, wherein the cradle is biased to pivot on the first pivot block and the second pivot block toward the wheel loading position.

15. The apparatus of claim 11 wherein the latch mechanism comprises a latch adjuster screw.

16. The apparatus of claim 11 wherein the latch release mechanism comprises a pivot arm anchored to a turntable.

17. The apparatus of claim 16 wherein the pivot arm further comprises a release plunger configured to extend through the turntable.

18. The apparatus of claim 17 wherein the release plunger impinges on a latch adjuster screw of the latch mechanism.

* * * * *